US006614441B1

(12) United States Patent
Jiang et al.

(10) Patent No.: US 6,614,441 B1
(45) Date of Patent: Sep. 2, 2003

(54) METHOD AND MECHANISM OF AUTOMATIC VIDEO BUFFER FLIPPING AND DISPLAY SEQUENCE MANAGEMENT

(75) Inventors: Hong Jiang, El Dorado Hills, CA (US); Arthur T. Chan, San Francisco, CA (US); Ashutosh Singla, Fair Oaks, CA (US); Richard W. Jensen, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/478,998

(22) Filed: Jan. 7, 2000

(51) Int. Cl.[7] .......................... G09G 5/00; G09G 5/399; G06T 1/60; G06F 15/167

(52) U.S. Cl. ....................... 345/539; 345/629; 345/530; 345/541

(58) Field of Search ................................ 345/539, 540, 345/541, 629, 722, 723, 547

(56) References Cited

U.S. PATENT DOCUMENTS 5,801,717 A * 9/1998 Engstrom et al. ........... 345/508
5,936,677 A * 8/1999 Fries et al. ................. 348/512
6,100,906 A * 8/2000 Asaro et al. ................ 345/508

* cited by examiner

*Primary Examiner*—Mark Zimmerman
*Assistant Examiner*—Scott Wallace
(74) *Attorney, Agent, or Firm*—Blakely, Sokoloff, Taylor & Zafman LLP

(57) ABSTRACT

A hardware-based graphics controller for processing video data in a computer system. Such graphics controller may include a video capture engine which captures fields of video data from a video source for storage in video buffers in sequential order, and generates video capture parameters from the video data for determining proper flipping operations of display contents of one image to another on a display monitor; and a video overlay engine coupled to the video capture engine, which determines proper flipping operations of display contents of one image to another from the video buffers and adjusts display settings of the display contents for a visual display on the display monitor based on the video capture parameters from the video capture engine.

29 Claims, 7 Drawing Sheets

FIG. 4A

| AUTOFLIP INDEX | VIDEO FORMAT | BUFFER MODE | DISPLAY MODE | VIDEO CAPTURE SIGNALS | | | MODIFIED DISPLAY SETTINGS | | | | | | |
|---|---|---|---|---|---|---|---|---|---|---|---|---|---|
| | | | | PICTURE COMPLETE [n-1]/[n] | BUFFER FIELD TYPE [n-1] /[n] | BUFFER METHOD [n-1] /[n] | PYp/PYc /PYf NOTE:PYc is THE BUFFER TO BE DISPLAYED | Fp/Fc /Ff | LINE INC | VSCALE | VIP HASE | HEIGHT | INIT. DELAY |
| 0 | P | P | 000 | 1/1 | 0/0 | 0/0 | -/P[n]/- | - | ST | SFV | Ph0 | H | 0 |
| 1 | 1 | P | 001 | 1/1 | 1/0 | 0/0 | -/P[n]/- | - | ST | SFV | Ph0 | H | 0 |
| | | | | 1/1 | 0/1 | 0/0 | -/P[n]/- | - | ST | SFV | Ph1 | H | 0 |
| 2 | 1 | P | 101 | 1/1 | 1/0 | 0/0 | P[n-2]/ P[n-1]/ P[n] | 0/1/0 | ST | SFV/2 | Ph0*2 | H*2 | 2 |
| | | | | 1/1 | 0/1 | 0/0 | P[n-2]/ P[n-1]/ P[n] | 1/0/1 | ST | SFV/2 | Ph0*2 | H*2 | 2 |
| 4 | 1 | 1 | 000 | 0/1 | 0/1 | 0/0 | -/P[n-1]/- | - | ST | SFV | Ph0*2 | H | 1 |
| | | | | 1/0 | 1/0 | 0/0 | -/P[n-1]/- | - | ST | SFV | Ph0*2 | H | 1 |
| 5 | 1 | 1 | 001 | 1/1 | 0/1 | 1/1 | -/P[n-1]/- | - | ST*2 | SFV*2 | Ph0 | H/2 | 1 |
| | | | | 1/1 | 1/0 | 1/1 | -/P[n-1]/ +ST/- | - | ST*2 | SFV*2 | Ph1 | H/2 | 1 |
| 7 | 1 | 1 | 101 | 1/1 | 1/0 | 1/1 | P[n-2]/ P[n-1]+ST /P[n] | 0/1/0 | ST*2 | SFV | Ph0*2 | H | 2 |
| | | | | 1/1 | 0/1 | 1/1 | P[n-2]+ST /P[n-1]/ P[n]+ST | 1/0/1 | ST*2 | SFV | Ph0*2 | H | 2 |

NOTATIONS:ST=STRIDE, PTR=BUFFER ADDRESS, SFV=VERTICAL SCALE FACTOR, H=SOURCE HEIGHT, Ph0=VERTICAL INITIAL PHASE FOR FIELD 0, AND Ph1 = VERTICAL INITIAL PHASE FOR FIELD 1. THEY REFER TO THE VALUES PROGRAMMED INTO THE OVERLAY ENGINE REGISTERS BY SOFTWARE.

FIG. 4B

| AUTOFLIP INDEX | VIDEO FORMAT | BUFFER MODE | DISPLAY MODE | VIDEO CAPTURE SIGNALS AT TIME n AND n-1 | | | MODIFIED DISPLAY SETTINGS | | | | | | |
|---|---|---|---|---|---|---|---|---|---|---|---|---|---|
| | | | | PICTURE COMPLETE ([n-2])*/[n-1]/[n] | BUFFER FIELD TYPE [n-1]/[n] | BUFFER METHOD ([n-2])*/[n-1]/[n] | PYp/PYc/PYf | Fp/Fc/Ff | LINE INC | VSCALE | VIP HASE | HEIGHT | INIT. DELAY |
| 6 | 11 | 1 | 011 | 0/1 OR 1/0 | 0/1 OR 1/0 | 0/0 | -/P[n-1]/- | - | ST | SFV | Ph0*2 | H | 1 |
| | | | | 1/1 | 1/0 OR 0/1 | 0/1 | -/P[n-1]/- | - | ST | SFV | Ph0*2 | H | 1 |
| | | | | 0/1 | 0/1 | 0/1 | -/P[n-1]/- | - | ST*2 | SFV*2 | Ph0 | H/2 | 1 |
| | | | | 0/1 | 1/0 | 0/1 | -/P[n-1]+ST/- | - | ST*2 | SFV*2 | Ph1 | H/2 | 1 |
| | | | | 1/1 | 0/1 | 1/1 | -/P[n-1]/- | - | ST*2 | SFV*2 | Ph0 | H/2 | 1 |
| | | | | 1/1 | 1/0 | 1/1 | -/P[n-1]+ST/- | - | ST*2 | SFV*2 | Ph1 | H/2 | 1 |
| | | | | 1/0 | 0/1 | 1/0 | -/P[n-1]/- | - | ST*2 | SFV*2 | Ph0 | H/2 | 1 |
| | | | | 1/0 | 1/0 | 1/0 | -/P[n-1]+ST/- | - | ST*2 | SFV*2 | Ph1 | H/2 | 1 |
| 8 | 11 | 1 | 111 | 0/1 OR 1/0 | 0/1 OR 1/0 | 0/0 | -/P[n-1]/- | - | ST | SFV | Ph0*2 | H | 1 |
| | | | | 1/1 | 1/0 OR 0/1 | 0/1 | -/P[n-1]/- | - | ST | SFV | Ph0*2 | H | 1 |
| | | | | 0/1 | 0/1 | 0/1 | -/P[n-1]/- | - | ST*2 | SFV*2 | Ph0 | H/2 | 1 |
| | | | | 0/1 | 1/0 | 0/1 | -/P[n-1]+ST/- | - | ST*2 | SFV*2 | Ph1 | H/2 | 1 |
| | | | | 1/1 | 0/1 | 1/1 | P[n-2]+ST/P[n-1]/P[n]+ST | 1/0/1 | ST*2 | SFV | Ph0*2 | H | 2 |
| | | | | 1/1 | 1/0 | 1/1 | P[n-2]/P[n-1]+ST/P[n] | 0/1/0 | ST*2 | SFV | Ph0*2 | H | 2 |
| | | | | 1/0 | 0/1 | 1/0 | -/P[n-1]/- | - | ST*2 | SFV*2 | Ph0 | H/2 | 1 |
| | | | | 1/0 | 1/0 | 1/0 | -/P[n-1]+ST/- | - | ST*2 | SFV*2 | Ph1 | H/2 | 1 |
| | | | | 0/1 | 0/0 | 0/1 | -/P[n-1]/- | - | ST*2 | SFV*2 | Ph0 | H/2 | 1 |
| | | | | 0/1 | 1/1 | 0/1 | -/P[n-1]+ST/- | - | ST*2 | SFV*2 | Ph1 | H/2 | 1 |
| | | | | (0)/1/1 OR (1)/1/1 | 0/1 | (0)/1/1 | -/P[n-1]/- | - | ST*2 | SFV*2 | Ph0 | H/2 | 1 |
| | | | | (0)/1/1 OR (1)/1/1 | 1/0 | (0)/1/1 | -/P[n-1]+ST/- | - | ST*2 | SFV*2 | Ph1 | H/2 | 1 |

METHOD AND MECHANISM OF AUTOMATIC VIDEO BUFFER FLIPPING AND DISPLAY SEQUENCE MANAGEMENT

TECHNICAL FIELD

The present invention generally relates to computer system architecture, and more particularly, relates to a method and mechanism of automatic video buffer flipping and display sequence management in a computer system.

BACKGROUND

A typical computer system includes a processor subsystem of one or more microprocessors such as Intel® i386, i486, Celeron™ or Pentium® processors, a memory subsystem, one or more chipsets provided to support different types of host processors for different platforms such as desktops, personal computers (PC), servers, workstations and mobile platforms, and to provide an interface with a plurality of input/output (I/O) devices including, for example, keyboards, input devices, disk controllers, and serial and parallel ports to printers, scanners and display devices. Chipsets may integrate a large amount of I/O bus interface circuitry and other circuitry onto only a few chips. Examples of such chipsets may include Intel® 430, 440 and 450 series chipsets, and more recently Intel® 810 and 8XX series chipsets. These chipsets may implement, for example, the I/O bus interface circuitry, direct memory access (DMA) controller, graphics controller, graphics memory controller, and other additional functionality such as graphics visual and texturing enhancements, data buffering, and integrated power management functions.

For graphics/multimedia applications, video data (i.e., audio and visual data) may be captured by one of these chipsets from a video source using general video capturing techniques, and concurrently displayed for viewing purposes. During active video or animation, a series of images may be displayed on a display monitor in sequential order. Video data may be sequentially stored in a series of buffers. Software is typically provided to drive video hardware specifically configured to sequentially store images in those buffers and "flip" display contents from one image to another. The flipping of display contents of images is activated through software interrupt service provided by an operating systems (OS) such as Microsoft Windows™ 95/98, Windows NT™ and Windows 2000™. However, due to interrupt latency (delay) problem, the software-based method of flipping display contents of images can be inefficient and/or unreliable. Moreover, such a software-based method can also be cost-prohibitive and burdensome in terms of processor cycles required while increasing the likelihood of display quality problems in heavily loaded systems.

Accordingly, a need exists for a hardware-based automated solution to simultaneous video capture and display without the need for software intervention, that is, to relieve the software from the task of flipping display contents of images and increase the efficiency and performance of the simultaneous video capture and display functions while minimizing the likelihood of display quality problems in heavily loaded systems and the processor cycles required.

SUMMARY

Accordingly, various embodiments of the present invention are directed to a hardware-based graphics controller for processing video data in a computer system. Such a graphics controller may include a video capture engine which captures fields of video data from a video source for storage in video buffers in sequential order, and generates video capture parameters from the video data for determining proper flipping operations of display contents of one image to another on a display monitor; and a video overlay engine coupled to the video capture engine, which determines proper flipping operations of display contents of one image to another from the video buffers and adjusts display settings of the display contents for a visual display on the display monitor based on the video capture parameters from the video capture engine.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein:

FIGS. 4A–4B illustrate a Truth Table of the auto-flip mechanism for maintaining predetermined display setting values for different auto-flip operations based on the sequence of video capture signals from the video capture engine and overlay control signals from the video overlay engine according to an embodiment of the present invention;

DETAILED DESCRIPTION

The present invention is applicable for use with all types of computer systems, processors, video sources and chipsets, including follow-on chip designs which link together work stations such as computers, servers, peripherals, storage devices, and consumer electronics (CE) devices for audio and video communications. The video source may include video storage media, video equipments and/or video consumer electronics (CE) devices. Examples of such consumer electronics (CE) devices may include digital video discs (DVD), audio compact discs (CD), videotapes, laser discs, CD-ROMs (read only memory), digital video cameras, digital still cameras, HD-TVs, satellite networks, cable networks, video cassette recorders (VCR), printers, scanners, imaging systems and cellular systems and those CE devices which may become available as technology advances in the future. However, for the sake of simplicity, discussions will concentrate mainly on a computer system having a basic graphics/multimedia platform architecture of multi-media engines executing in parallel to deliver high performance video capabilities, although the scope of the present invention is not limited thereto. The term "graphics" may include, but may not be limited to, computer-generated images, symbols, visual representations of natural or synthetic objects and/or scenes, pictures and text.

Figure 1:
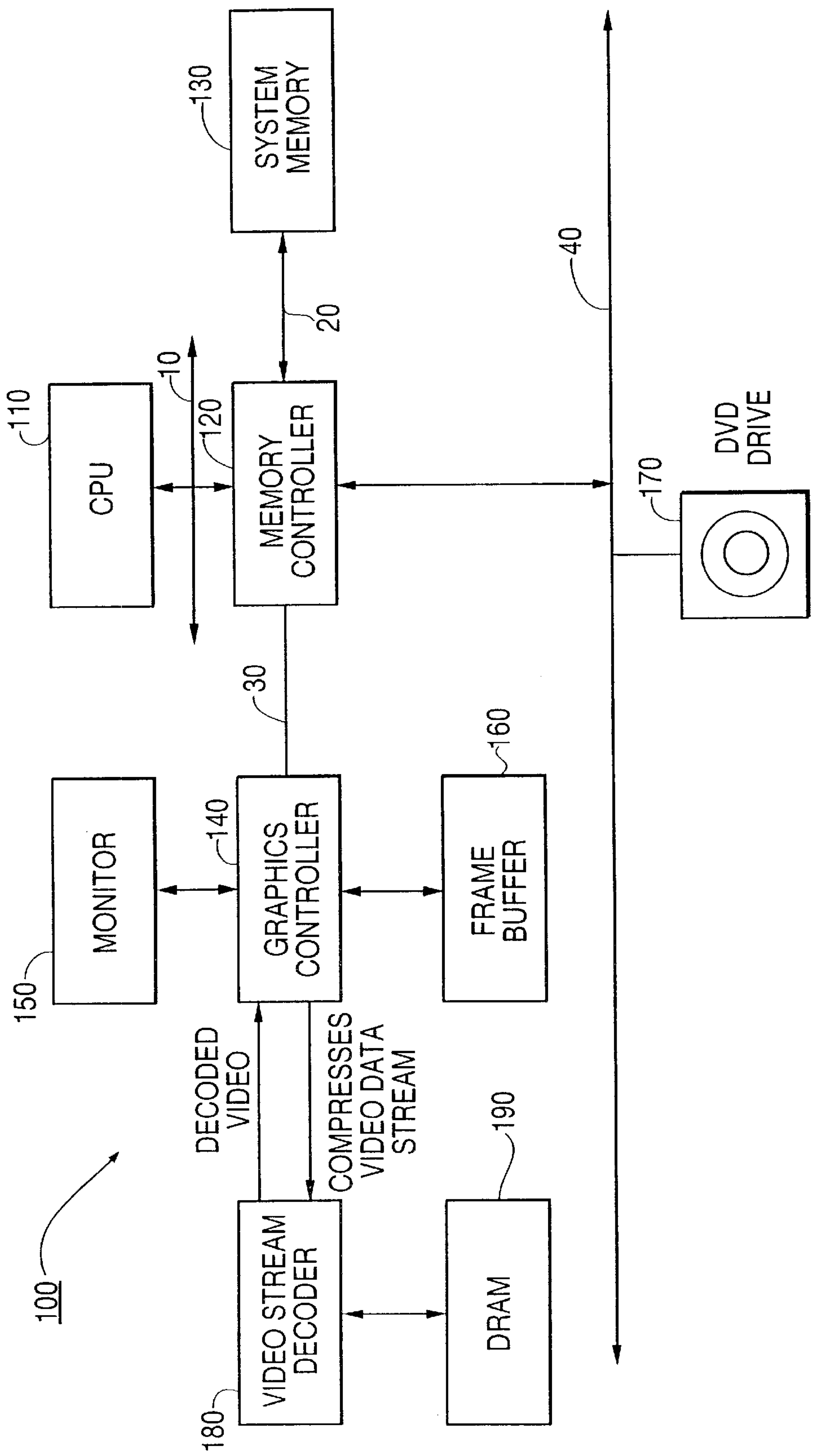
FIG. 1 illustrates a block diagram of an example computer system having a graphics/multimedia platform of multimedia engines according to an embodiment of the present invention.

Attention now is directed to the drawings and particularly to FIG. 1, in which an example computer system 100 having a graphics/multimedia platform of multi-media engines according to an embodiment of the present invention is illustrated. The, computer system 100 (which can be a system commonly referred to as a personal computer or PC) may include one or more processors or central processing units (CPU) 110 such as Intel® i386, i486, Celeron™ or Pentium® processors, a memory controller 120 connected to the CPU 110 via a front side bus 10, a system memory 130 connected to the memory controller 120 via a memory bus 20, a graphics controller 140 connected to the memory controller 120 via a graphics bus (e.g., Advanced Graphics Port "AGP" bus) 30.

Alternatively, the graphics controller 140 may also be configured to access the memory controller 120 via a peripheral bus such as a peripheral component interconnect (PCI) bus 40, if so desired. The PCI bus may be a high performance 32 or 64 bit synchronous bus with automatic configurability and multiplexed address, control and data lines as described in the latest version of "*PC1 Local Bus Specification, Revision* 2.1" set forth by the PCI Special Interest Group (SIG) on Jun. 1, 1995 for added-on arrangements (e.g., expansion cards) with new video, networking, or disk memory storage capabilities. The graphics controller 140 controls a visual display of graphics and/or video images on a display monitor 150 (e.g., cathode ray tube CRT, liquid crystal display LCD, and flat panel display FPD). The display monitor 150 can be either an interlaced or progressive monitor, but typically is a progressive display device. A frame buffer 160 may be coupled to the graphics controller 140 for buffering the data from the graphics controller 140, CPU 110, or other devices within the computer system 100 for a visual display of video images on the display monitor 150.

A digital video disc (DVD) drive 170 is connected to the memory controller 120 via the PCI bus 40. The DVD drive 170 may be configured to read data from any one of a number of currently available DVDs. For example, the DVD may be a DVD-Video disc for displaying a movie onto the display monitor 150. Alternatively, the DVD may be a DVD-ROM disc having a computer program stored thereon in order to run the program on the computer system 100. Since the embodiments of present invention are directed to displaying DVD-Video on the display monitor 150, all references hereinafter to DVD may pertain to DVD-Video.

In the described embodiment, video and audio data from the DVD may be obtained in compressed format. The DVD may store both progressive and interlaced video content in a compressed format in accordance with a standard developed by the Motion Picture Experts Group (MPEG) for use with audio-video data (e.g., MPEG-1, MPEG-2 and MPEG-4). For example, a complete description of the MPEG-2 standard can be found in "*Information Technology—Generic Coding of Moving Pictures and Associated Audio Information: Video*" published by the International Organization for Standardization (ISO) and the International Electrotechnical Commission (IEC); ISO-IEC 13818-2; May 15, 1996. However, the standard formats need not be limited to MPEG-2; other standards for use with audio-video data may also be readily utilized.

A video stream decoder 180 is connected to the graphics controller 140 and receives the compressed video data stream from the DVD drive 170. The video stream decoder 180 buffers the compressed video data stream in a dynamic random access memory (DRAM) 190, which is coupled to the video stream decoder 180. Although a DRAM is preferred for the speed, other storage devices such as a video random-access-memory (VRAM) may be utilized for the memory 190. The video stream decoder 180 then retrieves the video data from the memory 190 as needed and decompresses and decodes the video data. The decoded video data is output to the graphics controller 140 for processing and eventual display on the display monitor 150.

In a preferred embodiment of the present invention, the memory controller 120 and the graphics controller 140 may be integrated as a single graphics and memory controller hub (GMCH) including dedicated multi-media engines executing in parallel to deliver high performance 3-dimensional (3D) and 2-dimensional (2D) video capabilities. The GMCH may be implemented as a PCI chip such as, for example, PIIX4® chip and PIIX6® chip manufactured by Intel Corporation. In addition, such a GMCH may also be implemented as part of a host chipset along with an I/O controller hub (ICH) and a firmware hub (FWH). Examples of such a host chipset may include Intel® 810 and 8XX series chipsets which provide a highly-integrated three-chip solution consisting of a graphics and memory controller hub (GMCH; e.g., an Intel® 82810 or 82810-DC100 chip), an input/output (I/O) controller hub (ICH; e.g., an Intel® 82801 chip) and a firmware hub (FWH; e.g., an Intel® 82802 chip).

The GMCH may be interconnected to the system bus, include a memory controller as well as a graphic controller (which in turn may include a 3D engine, a 2D engine, and a video engine), and be interconnected to any of a system memory, a display cache (e.g., 4 megabytes (MB)), a display monitor and a television (TV; via an encoder and a digital video output signal). Likewise, the ICH may be interconnected to the GMCH, and any of: a PCI bus which may have any of a plurality of PCI-compliant slots, an Industry Standard Architecture (ISA) bus option and a local area network (LAN) option; an audio coder/decoder (Codec) and modem Codec; a plurality of Universal Serial Bus (USB) ports (USB Specification, Revision 1.0); and a plurality of Ultra/66 AT Attachment (ATA) 2 ports (X3T9.2 948D specification; commonly also known as Integrated Drive Electronics (IDE) ports). The USB ports and IDE ports may be used to provide an interface to a hard disk drive (HDD) and compact disk read-only-memory. (CD-ROM). I/O devices, a flash memory (e.g., EPROM) and super I/O may be connected to the ICH of the host chipset for extensive I/O supports and functionalities. Those I/O devices may include, for example, a keyboard controller for controlling operations of an alphanumeric keyboard, a cursor control device such as a mouse, a track ball, a touch pad, joystick, etc., a mass storage device such as magnetic tapes, hard disk drives (HDD), and/or floppy disk drives (FDD), and serial and parallel ports to printers and scanners. The flash memory and the super I/O may be connected to the ICH of the host chipset via a low pin count (LPC) bus. The flash memory may store a set of system basic input/output start up (BIOS) routines to be executed at startup of the computer system 100. The super I/O may provide an interface with another group of I/O devices.

Figure 2:
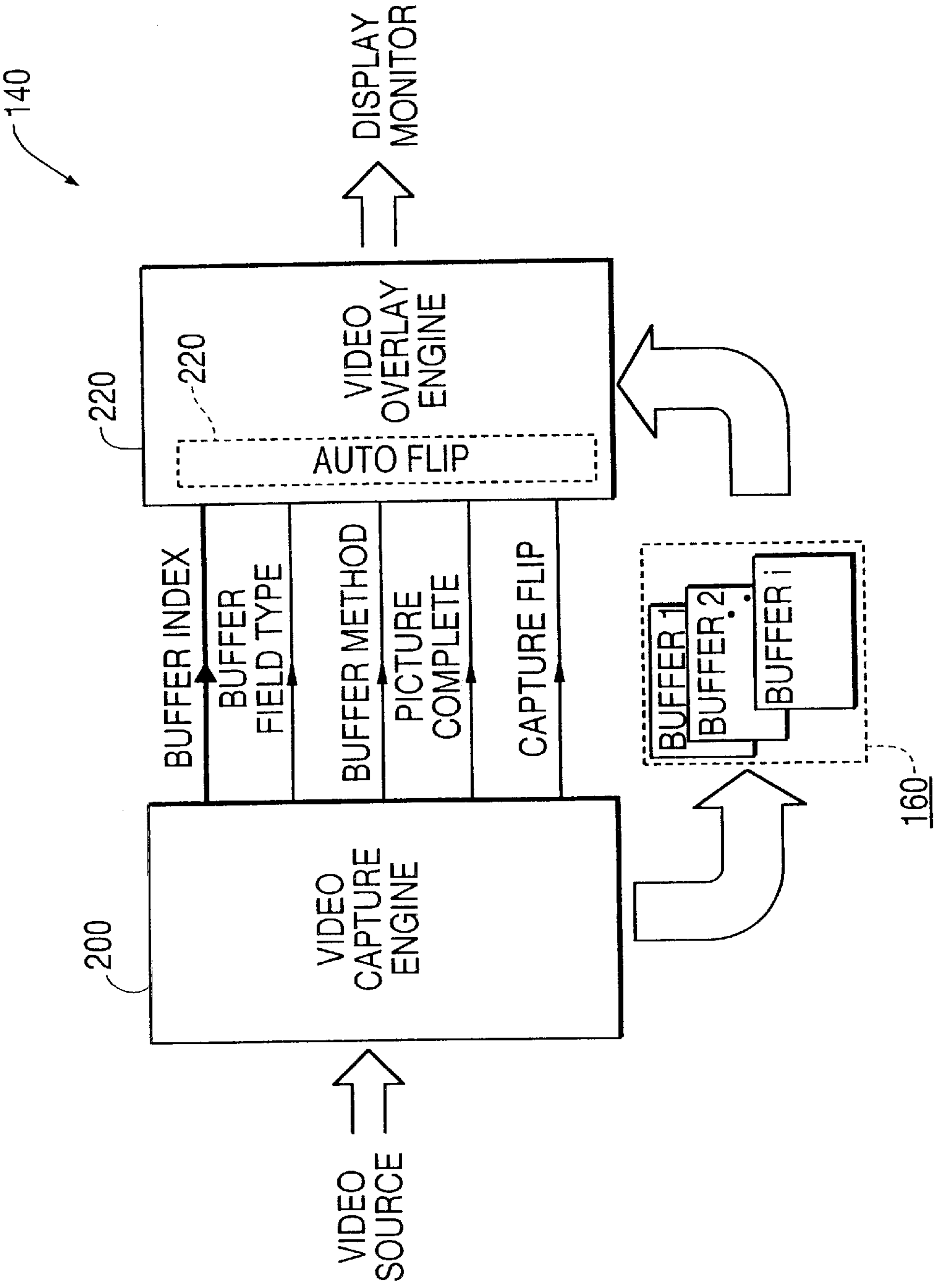
FIG. 2 illustrates an example graphics controller including a video capture engine and a video overlay engine of an example computer system for processing video data according to an embodiment of the present invention.

Turning now to FIG. 2, a block diagram of a graphics controller 140 for controlling the concurrent operation of capturing video data and displaying the same on a display monitor 150 according to an embodiment of the present invention is shown. The graphics controller 140 may include, but may not be limited to, a video capture engine 200 for capturing decoded video data from a video source (e.g., video stream decoder 180) and sending the decoded video data for storage in the frame buffer 160, and a video overlay engine 220 for retrieving video data from the frame buffer 160 for a visual display on a display monitor 150. The manner in which the video data is retrieved is determined by a particular display mode technique, referred to as "bob" and "weave" modes or methods for display on the display monitor 150. For example, the "bob" and "weave" methods may be used to adjust the video data for the progressive and interlaced contents of a video stream such that the video data may be properly displayed on the display monitor 150. The "bob" method may be used for displaying the video content having the interlaced format, while the "weave" method may be used for displaying the video content having the progressive format. A number of techniques can be implemented to perform the "bob and "weave" methods for displaying progressive and interlaced video contents.

The video capture engine 200 captures fields of video data for storage in the frame buffer 160 in sequential order, and generates video capture signals (input parameters) from the video data for determining proper flipping operations of display contents of one image to another on a display monitor 150. The video overlay engine 220 then determines proper "flipping" events (auto-flip operations) of display contents of one image to another from the frame buffer 160 and adjusts display settings of the display monitor 150 accordingly for a visual display of the decoded video data on the display monitor 150 based on the sequence of input video capture signals (input parameters) from the video capture engine 200. The video capture engine 200 also provides synchronization with the video overlay engine 220 for displaying the decoded video data on the display monitor 150.

The frame buffer 150 includes, for example, a bank of video buffers (e.g., buffer 1, buffer 2 . . . buffer i) forming a circular queue. One or more fields of video data from the video capture engine 200 are stored in each buffer in a sequential order from buffer 1 to buffer i, and then wraps back to buffer 1 again. Each video buffer of the frame buffer 150 may be a two-dimensional array specified by stride, width and height, and may operate as either an interleaved buffer or a progressive (non-interleaved) buffer for storing video data of different input video formats in different video buffer modes. For example, the video data stored in the video buffer may be: I=Interlaced video, II=Interlaced video with 3:2 pulldown information, or P=progressive or non-interlaced video. Buffer mode may be: I=Interleaved buffer, and P=Progressive or non-interleaved buffer.

During active video or animation, a series of images need to be displayed on the display monitor 150 in sequential order. In order to prevent tearing artifacts from appearing on the display monitor 150, the video data is sequentially stored in multiple buffers. Each video buffer is overwritten only after the image has been displayed on the display monitor 150. The video overlay engine 220 may synchronize the reading of video data to blanking intervals of the display monitor 150 and move from one buffer to the next buffer in the frame buffer 160 in order to provide a visual display of consecutive images on the display monitor 150.

According to an embodiment of the present invention, an auto-flip mechanism 240 may be provided within the video overlay engine 220 to automate the concurrent operation of video capture and display on the display monitor 150. The auto-flip mechanism 240 is used to relieve the software from the task of "flipping" the video buffers of the frame buffer 150 for the video overlay engine 220 during video capture in order to improve the efficiency and performance of the concurrent video capture and display functions while reducing the likelihood of display quality problems in heavily loaded systems and reducing the processor cycles required by the software interrupt service.

During video capture, the video capture engine 200 may fill a bank of buffers (e.g., buffer 1, buffer 2 . . . buffer I) of the frame buffer 160 with fields of video data in a sequential order. At the completed capture of each field of video data, the video capture signals (input parameters) are passed from the video capture engine 200 to the video overlay engine 220. These video capture signals may include, but may not be limited to: Buffer Index, Buffer Field Type, Buffer Method, Picture Complete, and Capture Flip. These input parameters may be defined as follows:

Buffer Index: A current buffer pointer which identifies the field of video data that has just been captured and the buffer that has just been filled with the currently captured field of video data.

Buffer Field Type: A field status flag which indicates whether the currently captured field is an even or odd field.

Buffer Method: An identification bit which indicates whether the video overlay engine 220 accesses the current buffer as an interleaved or non-interleaved buffer ("0"=Non-Interleaved, "1"=Interleaved). An interleaved buffer may hold two consecutive fields of video data with the even field occupying the even addresses of the buffer and the odd field occupying the odd addresses. A non-interleaved buffer may hold only one field of video data.

Picture Complete: A flag which indicates that the field just captured is a completion of a displayable picture, either a simple progressive frame, or an interlaced field or the second field of a progressive frame (that just completes a picture).

Capture Flip: An event which indicates that the video capture engine 200 has just completed the capture of a field of video data.

The auto-flip mechanism 240 may then interpret video capture signals (input parameters) such as, the Buffer Index, the Buffer Field Type, the Buffer Method, the Picture Complete, and the Capture Flip from the video capture engine 200 and determine the proper automatic "flipping" events (auto-flip operations) for the video overlay engine 220 without the need for software intervention.

Figure 3:
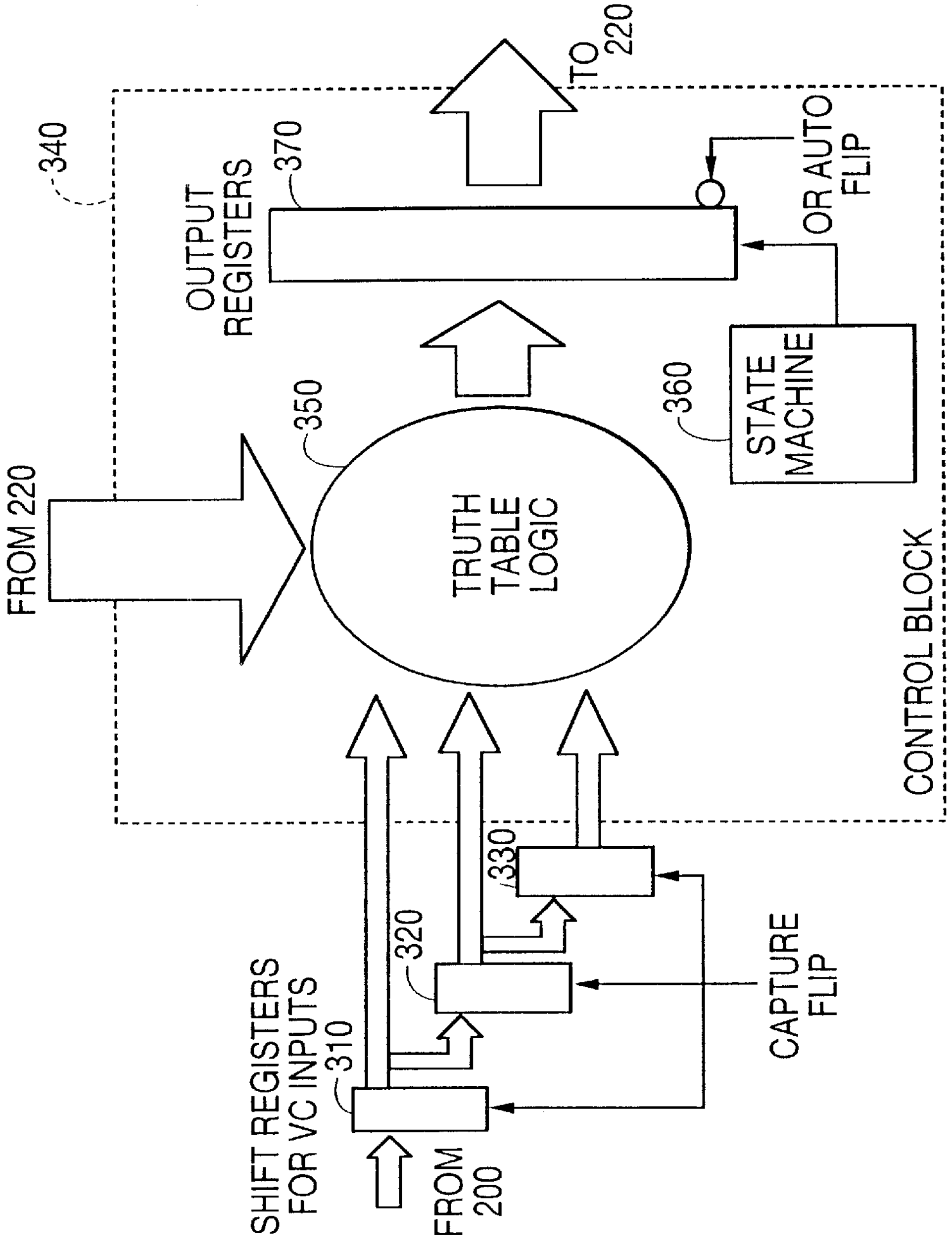
FIG. 3 illustrates an example block diagram of an auto-flip mechanism for interpreting input parameters from a video capture engine and determining proper control for a video overlay engine according to an embodiment of the present invention.

FIG. 3 illustrates an example block diagram of the auto-flip mechanism 240 for interpreting input parameters from the video capture engine 200 and determining the proper control for the video overlay engine 220 according to an embodiment of the present invention. As shown in FIG. 3, the auto-flip mechanism 240 may include a bank of registers 310, 320 and 330 used to synchronize the input parameters from video capture engine 200 and temporarily store those values, and a control block 340 used to control proper "flipping" events (auto-flip operations) based on the sequence of input parameters from the video capture engine 200 which are registered in the registers 310, 320 and 330.

The registers 310, 320 and 330 may be arranged, as sets of shift registers for holding, for example, the current values (n) and the previous two sets of values (n−1, n−2). Shifting may be triggered by the Capture Flip event.

The control block 340 may include a Truth Table (e.g., look-up table) 350, a State Machine 360 and output registers 370 used to define the behavior of the auto-flip mechanism 240. The Truth Table 350 maintains predetermined display setting values for different auto-flip operations based on the sequence of the video capture signals (input parameters) from the video capture engine 200 and overlay control signals from the video overlay engine 220. The State Machine 360 determines when to latch output results of the Truth Table 350 to the output registers 370, when to update the output registers 370 and how many initial delay cycles (Capture Flip events) to insert at the start of an input picture sequence on the display monitor 150.

The auto-flip operations may be classified in two categories: static-state conditions and dynamic-state conditions. Static-state auto-flip stands for the cases that the auto-flip operations stay in one operation condition. In contrast, the dynamic-state auto-flip stands for the cases that the auto-flip operates in different modes dynamically based on the input video type. Accordingly, the Truth Table 350 which illustrates auto-flip operations under static-state conditions is shown in FIG. 4A and dynamic-state conditions is shown in FIG. 4B.

Field definitions, code notations and signal terminology shown in FIGS. 4A–4B are described in Table 1 and Table 2 for simplification purposes.

TABLE 1

Code Description for Display Mode

| Display Mode Code | Description |
|---|---|
| 000 | Frame Display |
| 001 | Field Display |
| 011 | Auto 3:2 Pulldown Undo (auto-dynamic Bob and Weave) |
| 101 | Field Display With Three-Field Deinterlacing |
| 111 | Combined 3-Field Deinterlacing & 3:2 Pulldown Undo. |

TABLE 2

Overlay Control Signals & Display Setting Values

| | Description |
|---|---|
| Overlay Control Signals | |
| PYp, PYc, PYf | Buffer Pointer of the previous, current and future fields. PYp and PYf are only used in 3-field deinterlacing mode. PYc is the buffer being displayed |
| Fp, Fc, Ff | Field Type of the previous, current and future fields. Fp and Ff are only used in 3-field deinterlacing mode. |
| Line Inc | Line increment of all the buffers. It equals Stride if the buffer mode is progressive, and equal Stride*2 if the buffer mode is interleaved |
| Vscale | Vertical scaling factor used by the hardware |
| VIPhase | Vertical initial phase used by the hardware |
| Height | Source height used by the hardware |
| Initial Delay | Overlay initial delay after seeing the first Capture Flip event. |
| Display Setting Values | |
| ST | Stride |
| P[n] | Buffer address selected by Buffer Index[n] |
| SFV | Vertical scale factor |
| H | Source height |
| Ph0 | Vertical initial phase for field 0 |
| Ph1 | Vertical initial phase for field 1. |

Referring to FIGS. 4A–4B, the Truth Table 350 for auto-flip operations under static-state conditions and dynamic-state conditions (caused by the 3:2 pulldown undo operation in the video capture engine) according to an embodiment of the present invention is shown. Autoflip Index indicates different Autoflip operations. Static-state autoflip needs to obey the following rules:

When Autoflip Index=0, Autoflip operation may indicate WEAVE: regular progressive display for progressive video input captured in non-interleaved buffers. The picture height (H), the vertical scale factor (SFV), the stride (ST) and the initial vertical phase (Ph0) are programmed according to the input progressive frame.

When Autoflip Index=1, Autoflip operation may indicate BOB_NONINTERLEAVED display for interlaced video input captured in non-interleaved buffers. Data is stored one field per buffer. Each field of video may be displayed by "bobbing." The picture height (H), the vertical scale factor (SFV), and the stride (ST) are programmed according to the input field. The initial vertical phases (Ph0) and (Ph1) reference to field 0 and field 1, respectively.

When Autoflip Index=2, Autoflip operation may indicate 3FIELDBOB_NONINTERLEAVED display for interlaced video input captured in non-interleaved buffers (3-field deinterlacing only. No 3:2 pulldown undo). Data is stored one field per buffer. Each field of video may be displayed with 3-field deinterlacing. The picture height (H), the vertical scale factor (SFV), and the stride (ST) are programmed according to the deinterlaced frame. Only initial vertical phase (Ph0) is used.

When Autoflip Index=4, Autoflip operation may indicate WEAVE_INTERLEAVED display for interlaced video input captured in interleaved buffers. Data is stored two fields per buffer. Fields of video may be displayed by "weaving."

When Autoflip Index=5, Autoflip operation may indicate BOB_INTERLEAVED display for interlaced video input captured in interleaved buffers. Data is stored two fields per buffer. Fields of video may be display by "bobbing."

When Autoflip Index=7, Autoflip operation may indicate 3FIELD_BOB_INTERLEAVED display for interlaced video input in interleaved buffers (3-field deinterlacing only). Data is stored two fields per buffer. Fields of video may be displayed with 3-field deinterlacing. The picture height (H), the vertical scale factor (SFV), and the stride (ST) are programmed according to the interleaved frame. However, the initial vertical phases (Ph0) and (Ph1) refer to field 0 and field 1, respectively.

Dynamic-state Autoflip needs to obey the following rules when Autoflip Index=6 or 8, which are the same as in conditions when Autoflip index=4 (WEAVE_INTERLEAVED), 5 (BOB_INTERLEAVED) and 7 (3FIELD_BOB_INTERLEAVED). The picture height (H), the vertical scale factor (SFV), and the stride (ST) are programmed according to the complete frame. The initial vertical phases (Ph0) and (Ph1) are programmed according to the interlaced field 0 and field 1 picture, respectively.

For example, when Autoflip Index=6, Autoflip operation may indicate Automatic 3:2 pulldown with BOB_INTERLEAVED display for interlaced video input captured in interleaved buffers. The picture height (H), the vertical scale factor (SFV), and the stride (ST) are programmed according to the complete frame. Likewise, the initial vertical phases (Ph0) and (Ph1) are programmed according to the interlaced field 0 and field 1 picture, respectively.

When Autoflip Index=8, Autoflip operation may indicate Automatic 3:2 pulldown with 3FIELD_BOB_INTERLEAVED display for interlaced video input captured in interleaved buffers. The picture height (H), the vertical scale factor (SFV), and the stride (ST) are also programmed according to the complete frame. Likewise, the initial vertical phases (Ph0) and (Ph1) are programmed according to the interlaced field 0 and field 1 picture, respectively.

As shown in FIGS. 4A–4B, the Truth Table 350 of the auto-flip mechanism 240 automates video buffer "flipping" operations and provides proper display sequence management in a computer system. Since the graphics controller 140 and the memory controller 120 of the computer system 100 may be integrated as a single graphics and memory controller hub (GMCH) of a host chipset, the auto-flip mechanism 240 may be configured as a software module, a firmware module or a comprehensive hardware/software module which may be built-in the host chipset.

Figure 5:
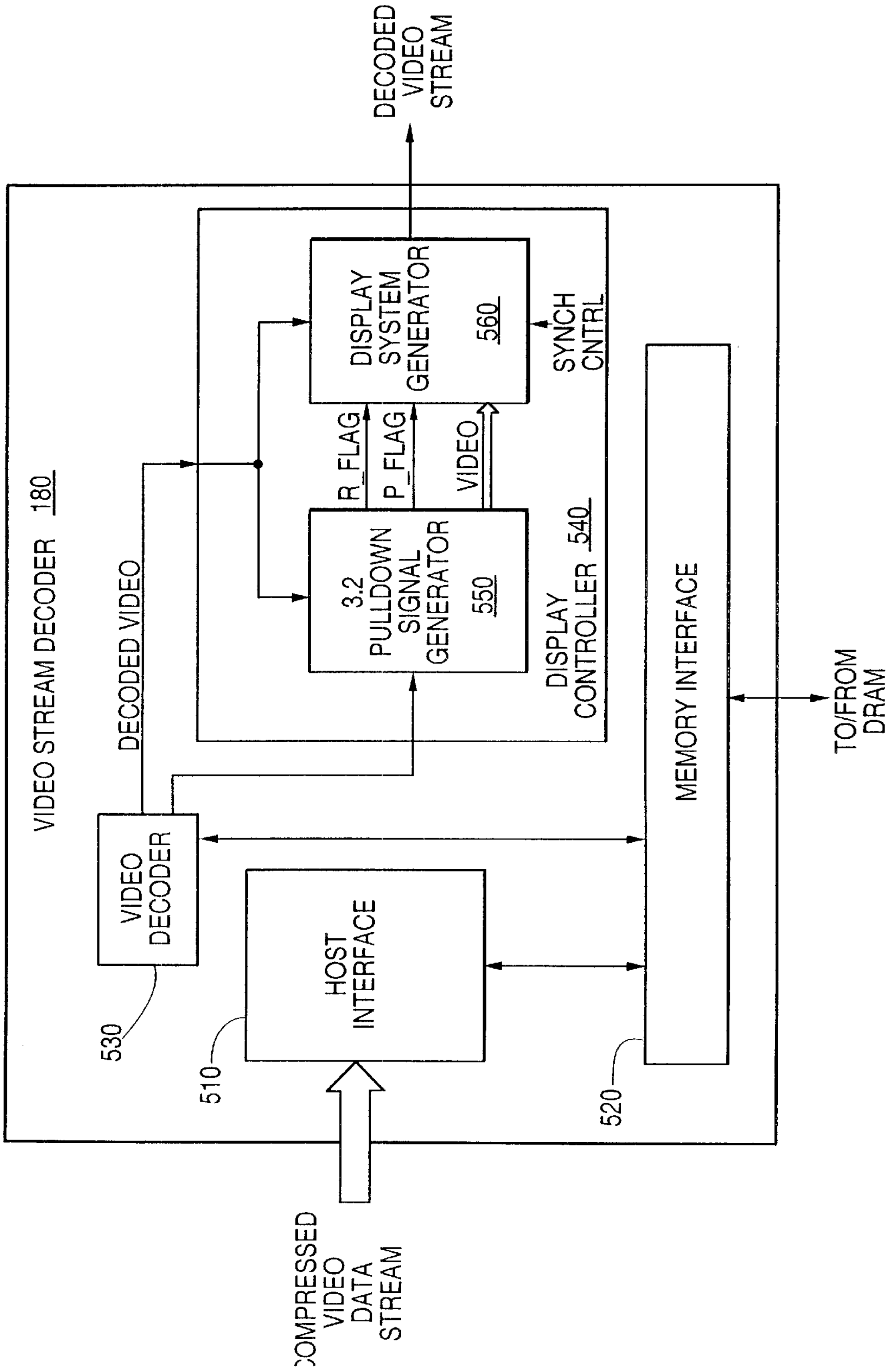
FIG. 5 illustrates an example video stream decoder of an example computer system for providing video data according to an embodiment of the present invention.
Figure 6:
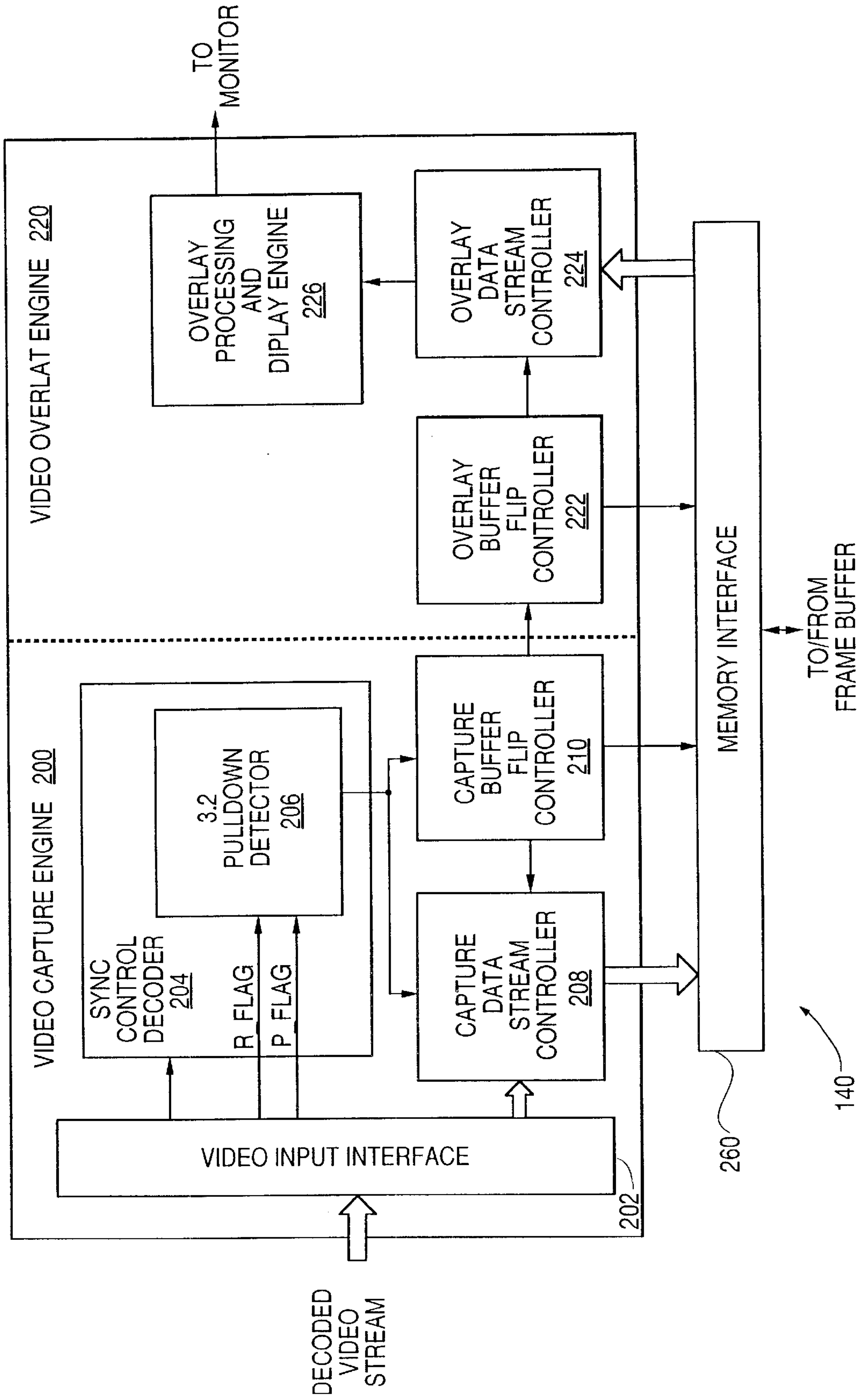
FIG. 6 illustrates another implementation of an example graphics controller including a video capture engine and a video overlay engine for processing video data according to an embodiment of the present invention.

For purposes of completeness, an example video stream decoder 180 for providing video data for the simultaneous operation of video capture and video display according to an embodiment of the present invention is shown in FIG. 5. The video stream decoder 180 may include a host interface 510, a memory interface 520, a video decoder 530, and a display controller 540 arranged to receive the compressed video data stream from the DVD drive 170 via the graphics controller 140, and decode the video data. The host interface 510 provides an interface to the graphics controller 140 for receipt of the compressed video data therefrom, and is coupled to the memory interface 520 for receipt of the video data from the memory 190. When the compressed video data stream enters the video stream decoder 180, the host interface 510 stores (buffers) the compressed video data stream in the memory 190 via the memory interface 520. Later, the video decoder 530 reads (retrieves) the video data from the memory 190 and decodes the video portion of the data.

The video decoder 530 couples the decoded data to the display controller 540, which performs the 3:2 pulldown conversion on the progressive frames of the decoded video data stream in a well known manner. As previously mentioned, the DVD typically has stored thereon portions of video data that are in a progressive format and portions of video data in an interlaced format. The display controller 540 performs a conversation (i.e., using the 3:2 pulldown technique) on the portions of the video data that are in the progressive format to the interlaced format. Accordingly, after the display controller 540 performs such 3:2 pulldown technique, the decoded video data will be in the interlaced format (i.e., the decoded video will be "field-based"). The display controller 540 retrieves the video data that is to be converted using the 3:2 pulldown technique from the DRAM 190 via the memory interface 520.

In the described embodiment of the present invention, the display controller 540 may be provided with a 3:2 pulldown signal generator 550 for generating a repeated_field_flag (R_flag) and a progressive_field_flag (P_flag), and a signal generator 560 for generating decoded video stream based on decoded parameters that are included in the MPEG-2 video data stream from the DVD. Examples of these binary parameters may include a top_field_first (TFF) parameter, which is used to indicate which field of a frame is first in the data stream; a repeat_first_field (RFF) parameter, which indicates whether or not a frame is to have a repeated first field; and a progressive frame (PF) parameter, which indicates the frames of the data stream that are in the progressive format. The parameters are decoded and extracted from the video stream by the video decoder 530, and are passed from the video decoder 530 to the display controller 540 for input to the 3:2 pulldown signal generator 550.

The 3:2 pulldown signal generator 550 generates the R_flag and the P_flag for each field of the decoded video data from the parameters TFF, RFF, and PF. Specifically, the R_flag is derived from the parameters TFF and RFF. When the display controller 450 performs a 3:2 pulldown operation and a repeated field is generated, the R_flag is set to "1". Conversely, if a field is not repeated in the 3:2 pulldown conversion, R_flag is set to "0" for that particular field. The P_flag is derived from the parameter PF (i.e., progressive frame parameter) from the decoded MPEG-2 video stream. If a particular field is part of a progressive frame, P_flag is set to "1" for that particular field, and if the field is not part of a progressive frame, P_flag is set to "0" for that particular frame.

The status of the P_flag and R_flag signals generated by the signal generator 560 for each field of the decoded video stream are then passed to the display system generator 560 which encodes the state of the P_flag and R_flag in each field of the decoded video stream. The display system generator 560 also receives synchronization control information from a synchronization control generator (not shown). The synchronization control generator may be resident on the video stream decoder chip 180 or, alternatively, on another device within the computer system 100. The display system generator 560 receives the decoded video data for inclusion in the decoded video stream. The decoded video stream, with R_flag and P_flag signals encoded thereon for each field of the stream, is then sent from the display system generator 560 to the graphics controller 140.

FIG. 5 shows only that portion of the graphics controller 140 for processing the decoded video. The graphics controller 140 may include the same video capture engine 200 for capturing decoded video data from a video source (e.g., video stream decoder 180) and sending the decoded video data for storage in the frame buffer 160, and the same video overlay engine 220 for retrieving video data from the frame buffer 160 for a visual display on a display monitor 150 as described with reference to FIG. 2. However, additional circuitry implementation is shown to complement with the video stream decoder 180 as described with reference to FIG. 5. For example, the video capture engine 200 may include a video input interface 202, a sync control decoder 204 including a 3:2 pulldown detector 206, a capture data stream controller 208 and a capture buffer flip controller 210. The capture buffer flip controller 210 may be responsible for generating video capture signals (input parameters) which coordinate "flipping" events (auto-flip operations). The video overlay engine 220 may include an overlay buffer flip controller 222, an overlay data stream controller 224, and an overlay processing and display engine 226. The overlay buffer flip controller 222 may be provided with an auto-flip mechanism 240 as shown in FIG. 3 for interpreting input parameters from the video capture engine 200 and determining the proper control for the video overlay engine 220 according to an embodiment of the present invention.

The video input interface 202 is arranged to receive the decoded video stream from the video stream decoder 180. The synchronization control decoder 204 is coupled to the video input interface 202. The synchronization control decoder 204 receives the decoded video stream and detects and decodes the synchronization control signals that were embedded in the video data stream by the display system generator 560 in the video stream decoder 180. The synchronization control signals, for example, are used for horizontal and vertical synchronization of the video for the separation of odd and even fields, as well as for other functions, which are well known to those skilled in the art.

The sync control detector 204 may include a 3:2 pulldown detector 206, which detects the R_flag and P_flag signals for each field of the decoded video stream, the synchronization control information and outputs to the capture data stream controller 208 and to the capture buffer flip controller 210 within the video capture engine 200. The capture data stream controller 208 sends video data from the decoded video stream for storage in a buffer memory (shown as the frame buffer 160), via a memory interface 260. Subsequently, the overlay data stream controller 224 of the video overlay engine 220 retrieves the video data from the frame buffer 160 and sends the video data to the overlay processing and display engine 226 for displaying the video on the display monitor 150.

As described with reference to FIG. 2, the frame buffer 160 includes a bank of video buffers (e.g., buffer 1, buffer 2 . . . buffer i) forming a circular queue. One or more fields of video data from the video capture engine 200 are stored in each buffer in sequential order from buffer 1 to buffer i, and then wraps back to buffer 1 again. The capture buffer flip controller 210 indicates which video buffer 1 or 2 of the frame buffer 160 to store the video data from the capture data stream controller 208. As the video data is stored in one of the video buffers 1, 2 by the capture data stream controller 208, the overlay data stream controller 224 extracts the video data from the other video buffer for displaying the video data on the display monitor 150 via the overlay processing and display engine 226.

The capture buffer flip controller 535 further generates video capture signals (input parameters) to the overlay buffer flip controller 222, which coordinates proper "flipping" events (auto-flip operations) or switches process between the video buffers1, 2 . . . i. For example, the capture data stream controller 208 may initially store video data in the first video buffer #1 of the frame buffer 160 while the overlay data stream controller 224 may retrieve video data from the second video buffer #2 to display such video on the display monitor 150. The capture data stream controller 208 and the overlay data stream controller 224 may then receive updated pointer information for video capture and overlay display pointers from their respective flip controllers 210 and 222, such that the capture data stream controller 224 may store video data in the second video buffer #2 and the overlay data stream controller 224 may extract the video data from the first video buffer #1 (which was previously stored by the capture data stream controller 208) for a visual display on the display monitor 150.

Accordingly, the capture and overlay data stream controllers 208, 224 may switch or swap the video buffers 1, 2 of the frame buffer 160. As the capture data stream controller 208 stores data to one buffer, the overlay data stream controller 224 may load data from the other buffer. A video capture buffer pointer (not shown) may be used to address the location in the buffer for storing the data, while an overlay display buffer pointer (not shown) may be used to address the location where data is to be retrieved.

As described from the foregoing, the present invention advantageously provides a mechanism to relieve the software from the task of flipping video buffers for the video overlay engine during video capture. During video capture, the video capture engine may fill a series of buffers with video data in a sequential order. The auto-flip mechanism may interpret input parameters from the video capture engine and determine the proper control for the video overlay engine without the need for software intervention, that is, to relieve the software from the task of flipping display contents of images and increase the efficiency and performance of the concurrent video capture and display functions, while minimizing the likelihood of display quality problems in heavily loaded systems and the processor cycles required.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the present invention is applicable to all types of computer systems and video consumer electronics (CE) devices, including, but not limited to, high definition TV (HDTV), video games, video imaging devices and video disks. The present invention is also applicable for all types of compressed video data stream in different formats, and need not be limited to the computer system 100 as shown in FIG. 1, but can be adapted to other video processing devices and systems. Many modifications may be made to adapt the teachings of the present invention to a particular situation without departing from the scope thereof Therefore, it is intended that the present invention not be limited to the various exemplary embodiments disclosed, but that the present invention includes all embodiments falling within the scope of the appended claims.

What is claimed is:

1. A graphics controller comprising:

a video capture engine which captures fields of video data from a video source for storage in video buffers in a sequential order, and generates video capture parameters from the video data for determining proper flipping operations of display contents of one image to another on a display monitor; and a video overlay engine coupled to said video capture engine, which determines proper flipping operations of display contents of one image to another from the video buffers and adjusts display settings of the display contents for a visual display on the display monitor based on the video capture parameters from the video capture engine.

2. The graphics controller as claimed in claim 1, wherein said video capture engine provides synchronization with said video overlay engine for displaying a series of images on said display monitor.

3. The graphics controller as claimed in claim 1, wherein said video buffers are contained in a frame buffer forming a circular queue in which one or more fields of video data from said video capture engine are stored in each video buffer in sequential order.

4. The graphics controller as claimed in claim 3, wherein each video buffer of the frame buffer is a two-dimensional array specified by stride, width and height, and operates as either an interleaved buffer or a progressive buffer for storing video data of different input video formats in different video buffer modes.

5. The graphics controller as claimed in claim 4, wherein said video overlay engine synchronizes reading of video data to blanking intervals of said display monitor and moves from one buffer to the next buffer in said frame buffer to provide a visual display of consecutive images on said display monitor.

6. The graphics controller as claimed in claim 1, wherein said Buffer Index corresponds to a current buffer pointer which identifies the field of video data that has just been captured and the buffer that has just been filled with the currently captured field of video data, said Buffer Field Type corresponds to a field status flag which indicates whether the currently captured field is an even or odd field, said Buffer Method corresponds to an identification bit which indicates whether the video overlay engine accesses the current buffer as an interleaved or non-interleaved buffer, said Picture Complete corresponds to a flag which indicates that the field just captured is a completion of a displayable picture, either a simple progressive frame, or an interlaced field or the second field of a progressive frame, and said Capture Flip corresponds to an event which indicates that the video capture engine has just completed the capture of a field of video data.

7. The graphics controller as claimed in claim 1, wherein said video overlay engine comprises an auto-flip mechanism provided to interpret said video capture parameters from the video capture engine and determine proper automatic "flipping" events for the video overlay engine without the need for software intervention.

8. The graphics controller as claimed in claim 7, wherein said auto-flip mechanism comprises:

a bank of shift registers arranged to synchronize the video capture parameters from video capture engine and temporarily store those parameters; and a control block arranged to control proper "flipping" events based on the sequence of input video capture parameters from the video capture engine registered in the shift registers, said control block comprising a Truth Table for maintaining predetermined display setting values for different auto-flip operations based on the sequence of the video capture parameters from the video capture engine and overlay control signals from the video overlay engine.

9. The graphics controller as claimed in claim 8, wherein said control block of said auto-flip mechanism further comprises output registers and a State Machine arranged to determine when to latch output results of the Truth Table to the output registers, when to update the output registers and how many initial delay cycles to insert at the start of an input picture sequence on the display monitor.

10. A computer system comprising:

a decoder to decode video data into fields based on content format of video data;

a buffer memory to store decoded fields of video data;

a graphics controller coupled to said decoder and said buffer memory, to store the decoded fields for a visual display on a display monitor, said graphics controller comprising:

a video capture engine to store the decoded fields of video data for storage in said buffer memory, and to generate video capture parameters from the video data for determining proper flipping operations of display contents of one image to another on said display monitor; and a video overlay engine coupled to said video capture engine, to determine proper flipping operations ofdisplay contents of one image to another from said buffer memory, and to adjust display settings of the display contents for a visual display on said display monitor based on the video capture parameters from the video capture engine.

11. The computer system as claimed in claim 10, wherein said video capture engine provides synchronization with said video overlay engine for displaying a series of images on said display monitor.

12. The computer system as claimed in claim 10, wherein said buffer memory comprises a plurality of video buffers forming a circular queue in which one or more fields of video data from said video capture engine are stored in each video buffer in sequential order.

13. The computer system as claimed in claim 10, wherein each video buffer of said frame memory is a two-dimensional array specified by stride, width and height, and operates as either an interleaved buffer or a progressive buffer for storing video data of different input video formats in different video buffer modes.

14. The computer system as claimed in claim 13, wherein said video overlay engine synchronizes reading of video data to blanking intervals of said display monitor and moves from one video buffer to the next video buffer in said frame memory to provide a visual display of consecutive images on said display monitor.

15. The computer system as claimed in claim 14, wherein said Buffer Index corresponds to a current buffer pointer which identifies the field of video data that has just been captured and the buffer that has just been filled with the currently captured field of video data, said Buffer Field Type corresponds to a field status flag which indicates whether the currently captured field is an even or odd field, said Buffer Method corresponds to an identification bit which indicates whether the video overlay engine accesses the current buffer as an interleaved or non-interleaved buffer, said Picture Complete corresponds to a flag which indicates that the field just captured is a completion of a displayable picture, either a simple progressive frame, or an interlaced field or the second field of a progressive frame, and said Capture Flip corresponds to an event which indicates that the video capture engine has just completed the capture of a field of video data.

16. The computer system as claimed in claim 10, wherein said video overlay engine comprises an auto-flip mechanism provided to interpret said video capture parameters from the video capture engine and determine proper automatic "flipping" events for the video overlay engine without the need for software intervention.

17. The computer system as claimed in claim 16, wherein said auto-flip mechanism comprises:

a bank of shift registers arranged to synchronize the video capture parameters from video capture engine and temporarily store those parameters; and a control block arranged to control proper "flipping" events based on the sequence of input video capture parameters from the video capture engine registered in the shift registers, said control block comprising a Truth Table for maintaining predetermined display setting values for different auto-flip operations based on the sequence of the video capture parameters from the video capture engine and overlay control signals from the video overlay engine.

18. The computer system as claimed in claim 17, wherein said control block of said auto-flip mechanism further comprises output registers and a State Machine arranged to determine when to latch output results of the Truth Table to the output registers, when to update the output registers and how many initial delay cycles to insert at the start of an input picture sequence on the display monitor.

19. A method for displaying video content on a display monitor, comprising:

receiving video data;

decoding received video data into fields;

capturing fields of video data for storage in video buffers in sequential order;

generating video capture parameters from the video data; and determines proper flipping operations of display contents of one image to another from said video buffers and adjusting display settings of the display contents for a visual display on said display monitor based on the video capture parameters.

20. The method as claimed in claim 19, wherein said video buffers form a circular queue in which one or more fields of video data are stored in each video buffer in sequential order.

21. The method as claimed in claim 19, wherein each video buffer is a two-dimensional array specified by stride, width and height, and operates as either an interleaved buffer or a progressive buffer for storing video data of different input video formats in different video buffer modes.

22. The method as claimed in claim 21, wherein said Buffer Index corresponds to a current buffer pointer which identifies the field of video data that has just been captured and the buffer that has just been filled with the currently captured field of video data, said Buffer Field Type corresponds to a field status flag which indicates whether the currently captured field is an even or odd field, said Buffer Method corresponds to an identification bit which indicates whether a video overlay engine accesses the current buffer as an interleaved or non-interleaved buffer, said Picture Complete corresponds to a flag which indicates that the field just captured is a completion of a displayable picture, either a simple progressive frame, or an interlaced field or the second field of a progressive frame, and said Capture Flip corresponds to an event which indicates that the video capture engine has just completed the capture of a field of video data.

23. The method as claimed in claim 19, wherein said video data is received from a digital video disk, DVD.

24. A system comprising:

a buffer memory to stores fields based on content format of video data;

a graphics controller to process fields of video data for a visual display, said graphics controller comprising:

a video capture engine to capture the fields of video data for storage in said buffer memory, and generates video capture parameters from the video data, including buffer index, buffer field type, buffer method, picture complete and capture flip parameters; and a video overlay engine to determine flipping operations of display contents from one image to another from said buffer memory and adjust display settings of the display contents for a visual display based on the video capture parameters from the video capture engine.

25. The system as claimed in claim 24, wherein said buffer memory comprises a plurality of video buffers forming a circular queue in which one or more fields of video data from the video capture engine are stored in each video buffer in a sequential order.

26. The system as claimed in claim 24, wherein said buffer index corresponds to a current buffer pointer which identifies the field of video data that has just been captured and the buffer that has just been filled with the currently captured field of video data, said buffer field type corresponds to a field status flag which indicates whether the currently captured field is an even or odd field, said buffer method corresponds to an identification bit which indicates whether the video overlay engine accesses the current buffer as an interleaved or non-interleaved buffer, said picture complete corresponds to a flag which indicates that the field just captured is a completion of a displayable picture, either a simple progressive frame, or an interlaced field or the second field of a progressive frame, and said capture flip corresponds to an event which indicates that the video capture engine has just completed the capture of a field of video data.

27. The system as claimed in claim 24, wherein said video overlay engine comprises an auto-flip mechanism to interpret said video capture parameters from the video capture engine and determine proper automatic "flipping" events for the video overlay engine without the need for software intervention.

28. The system as claimed in claim 27, wherein said auto-flip mechanism comprises:

a bank of shift registers to synchronize the video capture parameters from video capture engine and temporarily store the video capture parameters; and a control block to control proper "flipping" events based on the sequence of input video capture parameters from the video capture engine registered in the shift registers, said control block comprising a Truth Table for maintaining predetermined display setting values for different auto-flip operations based on the sequence of the video capture parameters from the video capture engine and overlay control signals from the video overlay engine.

29. The computer system as claimed in claim 28, wherein said control block of said auto-flip mechanism further comprises output registers and a State Machine arranged to determine when to latch output results of the Truth Table to the output registers, when to update the output registers and how many initial delay cycles to insert at the start of an input picture sequence on the display monitor.

* * * * *